United States Patent [19]

Nishimura et al.

[11] 4,058,688

[45] Nov. 15, 1977

[54] HEADPHONE

[75] Inventors: Yasutake Nishimura, Hirakata; Mitsuhiro Hasegawa, Osaka, both of Japan

[73] Assignee: Matsushita Electric Industrial Co., Ltd., Osaka, Japan

[21] Appl. No.: 648,306

[22] Filed: Jan. 12, 1976

[30] Foreign Application Priority Data

| | | |
|---|---|---|
| May 29, 1975 | Japan | 50-65055 |
| May 30, 1975 | Japan | 50-65484 |
| May 27, 1975 | Japan | 50-71751[U] |
| May 29, 1975 | Japan | 50-73205[U] |
| June 25, 1975 | Japan | 50-90147[U] |

[51] Int. Cl.[2] .......................... H04M 1/05; H04R 1/28

[52] U.S. Cl. ................................ 179/156 R; 179/180; 179/182 R

[58] Field of Search ............................ 179/156 R, 180

[56] References Cited

U.S. PATENT DOCUMENTS

| | | | |
|---|---|---|---|
| 1,560,718 | 11/1925 | Nowosielski | 179/156 R |
| 3,798,393 | 3/1974 | Gorike | 179/180 X |

*Primary Examiner*—William C. Cooper

*Attorney, Agent, or Firm*—Stevens, Davis, Miller & Mosher

[57] ABSTRACT

A headphone capable of attaining binaural hearing giving substantially the same sound quality as one would expect from ordinary loudspeakers, said headphone having such sound pressure versus frequency characteristics that there are two peaks between 1.5 and 5 KHz and the level differences between the low level area and the peaks are limited within the range of 6 to 17 dB. The headphone leads the sound from a transducer through the outside as well as inside of the headphone to the ears.

5 Claims, 18 Drawing Figures

(a)

(b)

HEADPHONE

The present invention relates to a headphone which is capable of attaining binaural hearing giving substantially the same sound quality as one would expect from ordinary loudspeakers.

In reproducing stereophonic sound, the sound pressure versus frequency characteristics are such that there are two peaks near 2 and 4 KHz and the level differences between the low level area and the peaks are limited within the range of 6 to 17 dB because of the resonance in the external part of the ears and the diffraction of sound wave by the head and auricle. An object of the present invention is to provide a headphone which has a sound pressure versus frequency characteristics such that the wearer of the headphone hears sound which is of substantially the same quality as stereophonic sound.

Another object of the present invention is to provide a headphone in which, in order to attain sound which more accurately resembles stereophonic sound, the sound from each transducer is in part led through the headphone case to the outside so as to be introduced into the ears of a listener from the outside of the headphone as well as directly from the transducer thereby eliminating the listener's sense of isolation.

Another object of the present invention is to provide a headphone which, in order to attain more accurate stereophonic hearing, includes in each transducer unit a cone portion having a dome formed at its center as a vibrating plate constituting the transducer and a corrugation formed at its circumference for lowering the low frequency limit.

Another object of the present invention is to provide a headphone which includes transducer units each capable of being simply mounted on a baffle plate, mounting perforations capable of being partly used for leading sound to the outside and an improved distance adjusting mechanism so as to be light in weight and comfortable during wearing.

Figure 1:
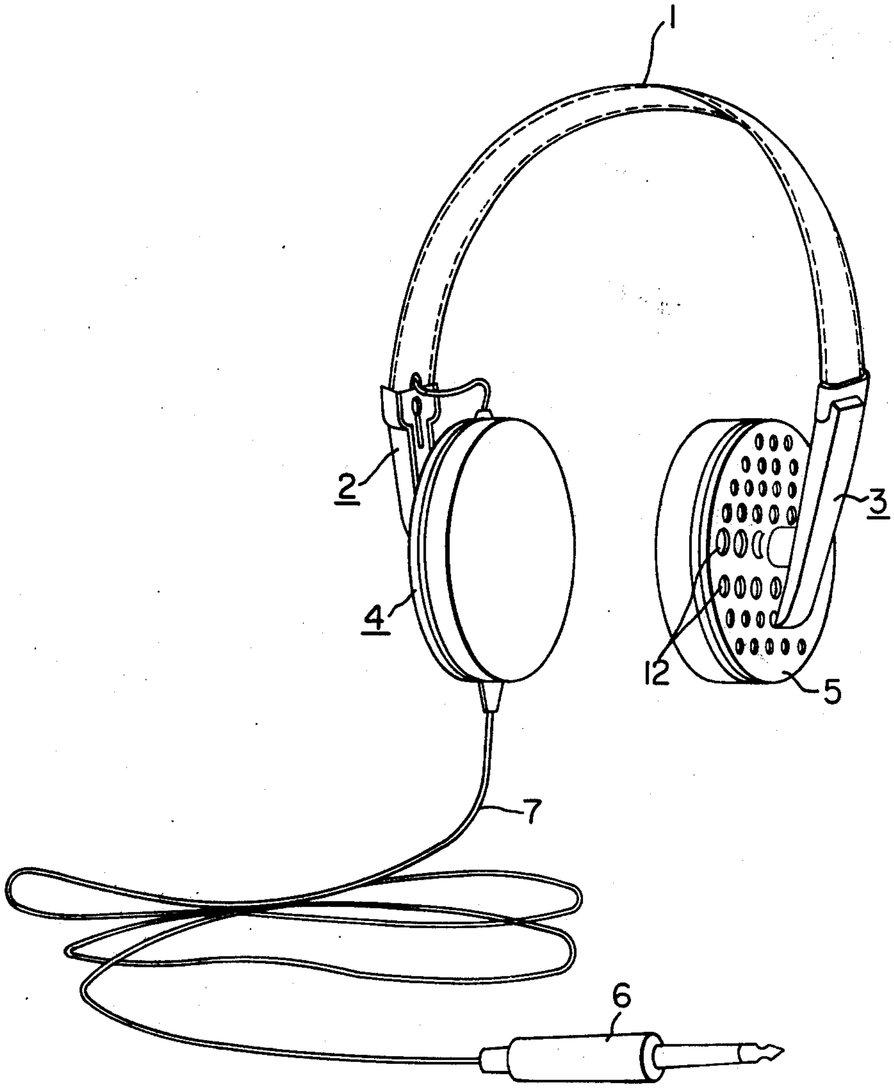
Figure 2:
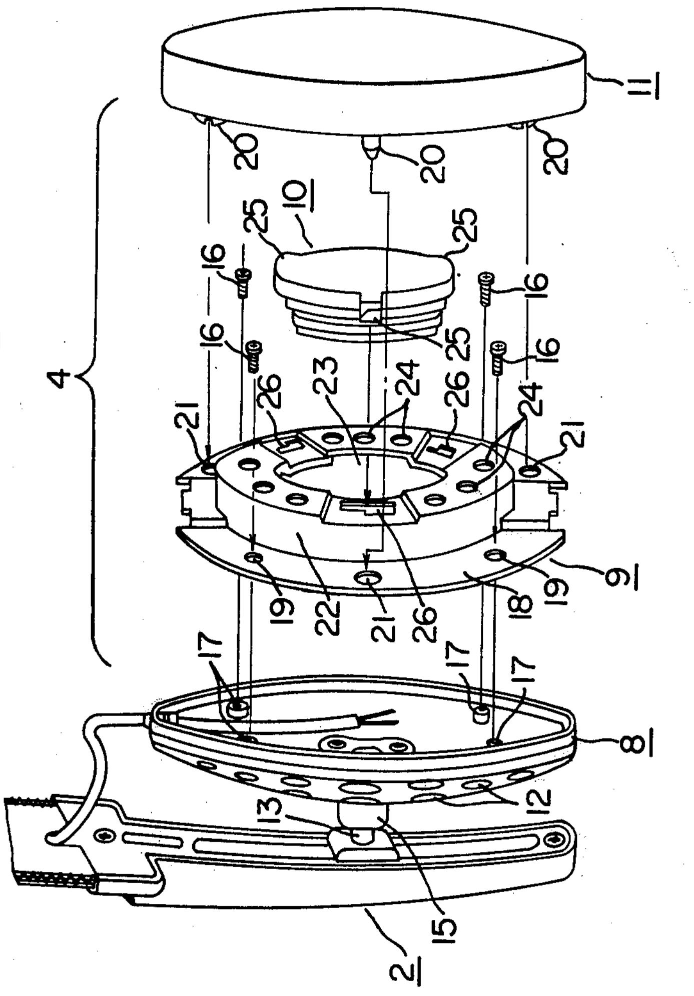
Figure 3:
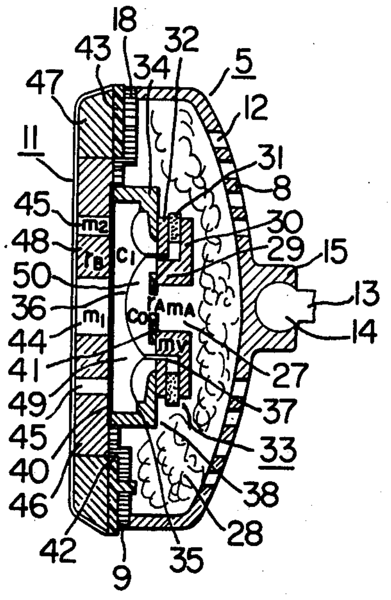
Figure 4:
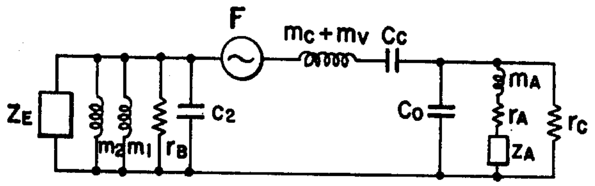
Figure 5:
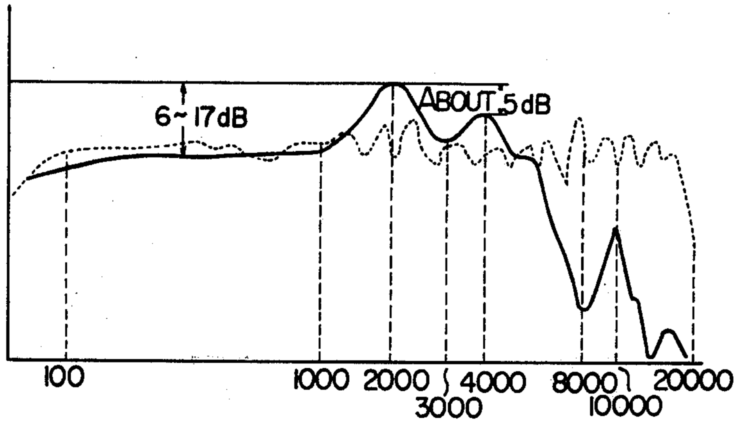
Figure 6:
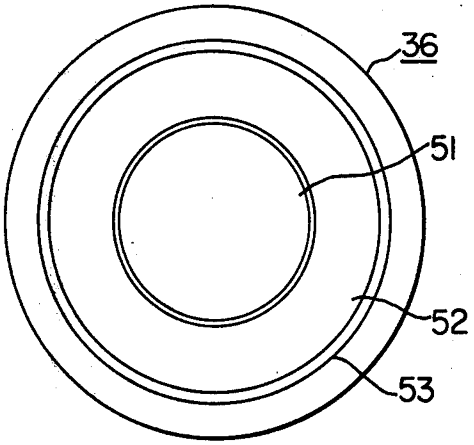
Figure 6:
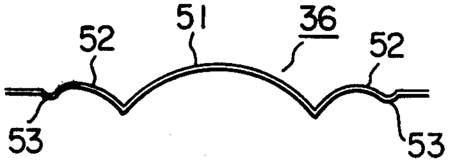
Figure 7:
Figure 8:
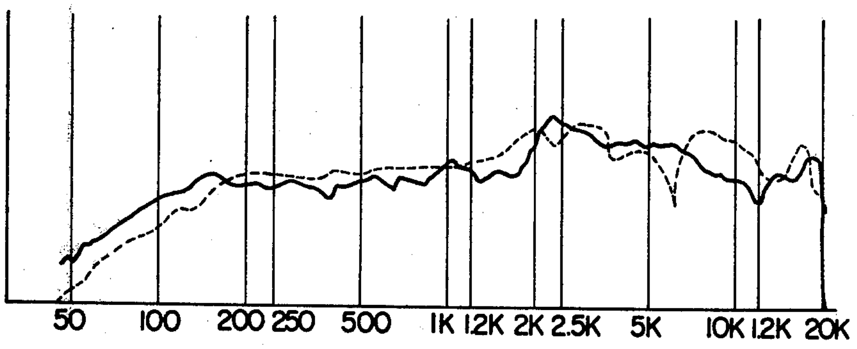
Figure 9:
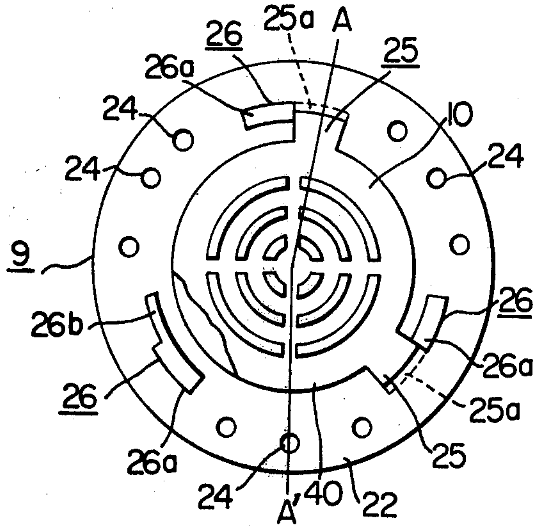
Figure 10:
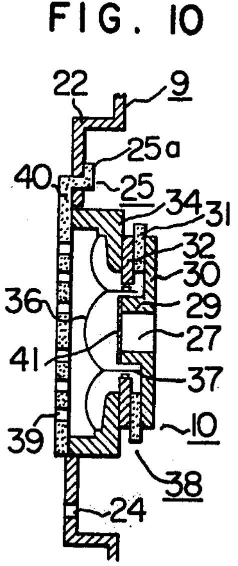
Figure 11:
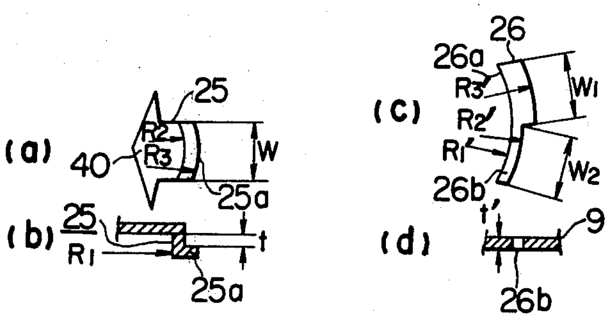
Figure 12:
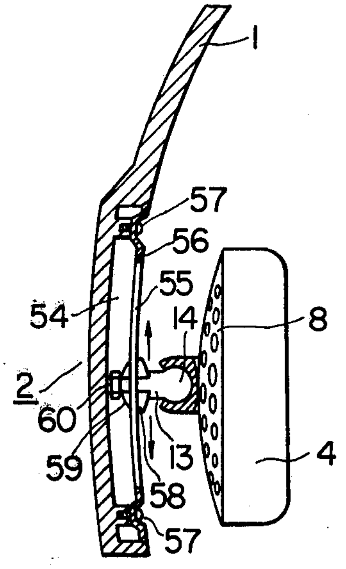
Figure 13:
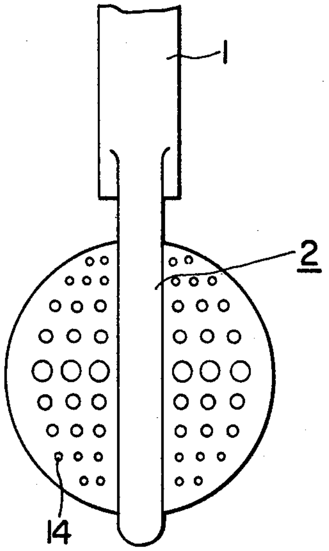
Figure 14:
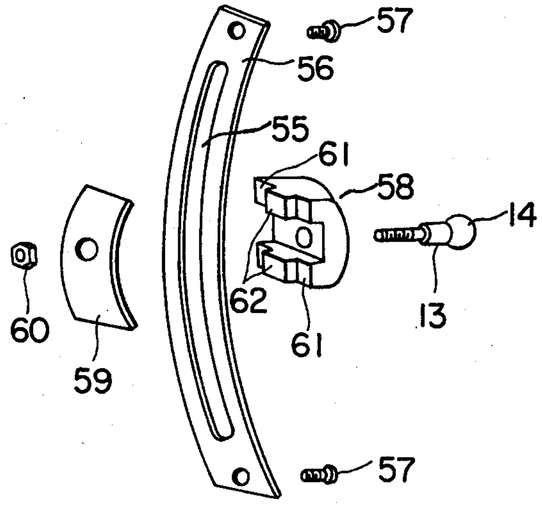

Other objects, features and advantages of the present invention will be readily apparent from the detailed descriptions taken in conjunction with the accompanying drawings, in which:

FIG. 1 is a perspective of a headphone of the present invention,

FIG. 2 is a view illustrating the constitution of the headphone shown in FIG. 1, FIG. 3 is a cross sectional view of a headphone of the present invention, FIG. 4 shows an equivalent circuit of the headphone of FIG. 3, FIG. 5 shows the sound pressure versus frequency characteristics of the headphone of the present invention, FIGS. 6(*a*) and (*b*) shows a domed cone type vibrating plate 36, FIG. 7 is a view illustrating the reciprocating motion of a cone portion 52, FIG. 8 shows the sound pressure versus frequency characteristics of the domed cone type vibrating plate, FIGS. 9, 10, 11(*a*), 11(*b*), 11(*c*), and 11(*d*) are views illustrating in detail the constitution for connecting a transducer unit in the headphone of the present invention, and FIGS. 12 to 14 are views illustrating a mechanism for adjusting the distance between both ends of the headphone.

Now, the present invention will be described in detail.

FIG. 1 is a perspective view of a headphone of the present invention. Reference numeral 1 is a head band which is formed of elastic synthetic resin and is provided on its surface with an exterior decoration of leather or the like. On both ends of the head band 1, there are provided distance adjusting mechanisms 2 and 3 on which are further provided headphone bodies 4 and 5, respectively. From one of the headphone 4 extends a cord 7 having a plug 6 at its end.

FIG. 2 illustrates the construction of the headphone body 4 or 5. The headphone body 4 is comprises a headphone case 8 formed of synthetic resin and having an opening in its front surface, a baffle plate 9 fixed to the opening of the headphone case 8, a transducer unit 10 connected with the baffle plate 9, and a cover 11.

The headphone case 8 is provided with a large number of perforations 12 through the back surface, a holding projection 15, at the center, for holding a globe 14 at one end of a supporting rod 13 which forms a part of the distance adjusting mechanism 2 (or 3), and a number of fixing bosses 17, on the front surface, for fixing together with bolts 16 the baffle plate 9.

The baffle plate 9 is also formed of synthetic resin and is provided, in its circumferential flat portion 18, with bolt holes 19 for receiving the bolts 16 and fitting holes 21 for receiving fitting legs 20 of the cover 11. At the central portion, plate 9 is provided with a cylindrical projection 22 which projects forwardly relative to the flat portion 18 and has a fixing opening 23 for fixing the transducer unit 10 at its center and, around the fixing opening 23, a large number of sound radiating holes 24 and a small number of connecting holes 26 for receiving connecting members 25.

A transducer unit 10 consists of a transducer 38 and a grill 40. The transducer 38 comprises a magnetic field producing element 33 including a plate having a center pole 29 with a through hole 27 perforated along its axis, a ring-shaped magnet 31 and a ring-shaped upper plate 32, a stepped frame 34 of synthetic resin or the like, a domed-cone type vibrating plate or element 36 fixed at its circumferential portion to the step portion 35 of the frame 34, and a voice coil 37 connected with the vibrating plate 36 and partly penetrating into the magnetic gap of the field element 33. The grill 40 is formed of synthetic resin, is mounted in front of the transducer 38 and comprises a large number of sound radiating holes 39 and a small number of equally spaced L-shaped connecting members 25 around the sound radiating holes 39 for being connected with the connecting holes 26 in the baffle plate 9. Further, the upper surface of the center pole 29 is provided at the top end of the through hole 27 with a damper 41 of felt or the like.

The cover 11 comprises a cover body 43, an ear pad 46, another ear pad 47 and an ear pad cover 48. The cover body 43 is provided with a central opening 42 adapted to substantially fit the cylindrical projection 22 of the baffle plate 9 and is made of synthetic resin with the fitting legs 20 integrally formed. The ear pad 46 is arranged at the central portion of the cover body 43, is formed of air-permeable expanded urethane and is provided with perforations 44 and 45 formed at its center. The ear pad 47 is arranged at the circumferential portion of the cover body 43 and is formed in a ring shape and of air-impermeable expanded urethane. The ear pad cover 48 is made of air-permeable cloth and covers the ear pads 46 and 47 and the circumferential portion of the cover body 43.

In the above-described construction, the space between the headphone case 8 and the baffle plate 9 having the transducer unit 10 mounted thereon is filled with a damper material 28 such as glass wool or unwoven cloth.

Now, assuming that the inertance by the through hole 27 in the center pole 29 is $m_A$, the mass of the domed-cone type vibrating plate 36 is $m_C$, the mass of the voice coil 37 is $m_V$, the acoustic resistance of the damper 41 is $r_A$, the acoustic resistance of the ear pad 46 is $r_B$, the acoustic resistance of the damper 28 is $r_C$, the inertances by the perforations 44 and 45 of the ear pad 46 are $m_1$ and $m_2$, respectively, the acoustic capacity of the space 49 in front of the domed cone type vibrating plate 36 is $C_1$, the acoustic capacity of the space 50 at the back of the domed cone type vibrating plate 36 is Co, the radiation impedance is $Z_A$ and the driving force applied to the vibrating system is F, the equivalent circuit of the headphone shown in FIG. 3 is expressed as shown in FIG. 4. In this embodiment, a peak around 2 KHz is formed by selecting a suitable value of the inertance $m_A$ by the through hole 27 in the center pole 29, another peak around 4 KHz is formed by selecting suitable values of the inertances $m_1$ and $m_2$ by the perforations 44 and 45 of the ear pad 46, and the sound pressure versus frequency characteristics having two peaks around 2 and 4 KHz and a level difference of 6 to 17 dB between the low level frequency area and the peaks, as shown by the solid line in FIG. 5, are formed by controlling the acoustic resistances $r_A$, $r_B$ and $r_C$ so as to adjust the whole values as well as the peak values. The sound pressure versus frequency characteristics shown by the broken line in FIG. 5 are obtained in a free acoustic field when a loudspeaker or speaker system is disposed at an angle of 30° in front of a listener but the characteristics on the eardrums of the listener in the free acoustic field are substantially the same as shown by the solid line in FIG. 5.

Thus, it is possible to make the sound pressure versus frequency characteristics of a headphone substantially the same as those on the eardrums of a listener in a free acoustic field.

Of course, it is possible to obtain similar characteristics also by changing other inertances and acoustic resistances. However, in any case, it was confirmed that, when there are two peaks between 1.5 and 5 KHz and a level difference of 6 to 17 dB between the low level frequency area and the peaks, the hearing sensation can be made substantially the same as in a free acoustic field.

Further, since the headphone of the present invention is so constituted that the sound generated by the doomed cone type vibrating plate 36 is led through the through hole 27 in the center pole 29 to the back side of the transducer 38, further led through the perforations 12 of the headphone case 8 or through the sound radiating holes 24 of the baffle plate 9 and the air-permeable ear pad 46 to the outside, and the sound led to the outside reaches the ears of a listener not only together with the sound directly reached from the domed cone vibrating plate 36 of the transducer 38 through the perforations 44 and 45 of the ear pad 46 but also with the outside background noise; it is possible according to the present invention to eliminate the sense of isolation and to attain more accurate stereophonic hearing. Further, since the headphone case 8 is provided with perforations 12 and the air-permeable ear pad 46 is provided at the central portion of the cover body 43, the space filled by the baffle plate 9 and the headphone case 8 and the space constituted by the ear and the baffle plate 9 do not cause any resonance and no peak or dip appears in undesired portions of the sound pressure versus frequency characteristics; that is, the characteristics are much stabilized.

The domed cone type vibrating plate 36 can reproduce sound ranging from low frequencies to high frequencies. That is, as shown in FIGS. 6(*a*) and 6(*b*), a dome portion 51 mainly reproduces the high frequency region while a cone portion 52 reproduces the medium and low frequency regions. The domed cone type vibrating plate 36 is conventionally formed of a synthetic resin film such as a polyester film. However, in accordance with the present invention, a corrugation portion 53 which is much smaller in radius of curvature than and curved in a direction opposite to the cone portion 52 is provided along the circumference of the cone portion 52 so that the vibrating plate 36 can increase its compliance and can easily make a reciprocating motion thus causing the low frequency limit to be further lowered as shown by the solid line in FIG. 8. The broken line in FIG. 8 illustrates the sound pressure versus frequency characteristics of a domed cone type vibrating plate not comprising any corrugation portion. In addition, both of the curves illustrated in FIG. 8 are not the characteristics of the headphones but those of the transducer.

By comparing both of the curves in FIG. 8, it is evident that the transducer of the present invention has a much lower low frequency limit than conventional transducers.

As a result, it is possible to obtain excellent low frequency sound reproduction by a small-sized transducer; that is, it is possible to reproduce with excellent results sound ranging from low frequencies to high frequencies and to attain more accurate stereophonic reproduction.

Next, the mechanism for connecting the transducer 10 with the baffle plate 9 fixed to the headphone housing 8 will be described in detail with reference to FIGS. 9, 10 and 11.

Each of the connecting holes 26 in the baffle plate 9 consists of a wide hole 26*a* capable of receiving the projection 25*a* of the L-shaped connecting member 25 and a narrow hole 26*b* adjoiningly formed with the wide hole 26*a* and incapable of receiving the projection 25*a*.

Now, as illustrated in FIGS. 11(*a*), (*b*), (*c*) and (*d* asssuming that the internal and external diameters of the connecting member 25 and $R_1$ and $R_2$, respectively, the external diameter of the projection 25*a* is $R_3$, the internal and external diameters of the wide hole 26*a* in the connecting hole 26 and $R_1'$ and $R_3'$, respectively, the external diameter of the narrow hole 26*b* is $R_2'$, the height of the connecting member 25 is *t*, the thickness of the baffle plate 9 is *t'*, the width of the connecting member 25 is W, the width of the wide hole 26*a* is W', and the width of the narrow hole 26*b* is $W_2'$, the following relations are required to be established.

$R_1' < R_1 < R_2 < R_2' < R_3 < R_3'$ $t \approx t'$, and $W < W' = W_2'$.

Because of the above-mentioned construction, when the connecting member 25 of the grill 40 is inserted into the wide hole 26a in the connecting hole 26 of the baffle plate 9 thereby to make the projection 25*a* project from the back surface of the baffle plate 9 and the grill 40 is rotated clockwide in FIG. 9, the projection 25*a* is engaged with the periphery of the narrow hole 26*b* whereby the grill 40 is securely fixed to the baffle plate 9. That is, the transducer 10 is securely fixed to the baffle plate 9 and, if the grill 40 is rotated in the opposite direction or counterclockwise, the transducer 10 can be removed. Further, if transducer 10 is not required to be removed, the attachment can be further strengthened by applying adhesives.

Though this embodiment is provided with three connecting members 25 and three connecting holes 26, two or more than three pairs of connecting members and connecting holes may be provided.

By the above-mentioned construction, the ease of assembling the headphone is improved and the transducer unit 10, if it becomes inoperative, can be easily exchanged thus improving the efficiency of repairing.

In addition, the wide hole 26*a* in the connecting hole 26 of the baffle plate 9 is, after receiving the transducer unit 10, adapted to lead sound from the backside of the transducer through the wide hole 26*a* and the air-permeable ear pad 46 to the outside thereby, just as in the hereinbefore described case, to attain more accurate stereophonic sound.

FIGS. 12 to 14 illustrate the construction of the distance adjusting mechanism 2 and 3 for adjusting the distance between both ends of the head band 1.

At each end of the head band 1, there is provided a recess 54 over which a slide base 56 made of a metal plate having a slide slit formed at its center is fixed by bolts 57. The headphone body 4 or 5 is coupled with the slide base 56.

That is, the supporting rod 13, which is held to the back surface of the headphone housing 8 by the globe 14 forming a universal connection, is fitted into the slider 58 so that the supporting rod 13 partly projects through the slide slit 55 of the slide base 56 and a leaf spring 59, and finally a nut 60 is threadedly engaged with the projecting end of the supporting rod 13 for connecting the headphone body 4 or 5 with the slide base 56.

The slider 58 is formed of synthetic resin and in the shape of a U and is provided with bosses 62 at the central portions of the end surfaces abutting against the slide base 56, which bosses 62 are guided by the slide slit 55 for sliding therealong.

Further, it is possible by turning the nut 60 to bend the leaf spring 59 thereby adjusting the slidability of the headphone body 4 or 5 to the slide base 56.

By the above-mentioned construction, the distance adjusting mechanisms 2 and 3 can be made light and compact and can be worn easily by the listener. Thus, the wearing of the headphone is made more comfortable.

As described above, the headphone of the present invention, because of the hereinbefore described construction makes it possible to obtain with a headphone substantially the same affect as is obtained with stereophonic. Further, the headphone is comfortable and tireless to wear, easy to assemble and handle and can be improved during repair service. Consequently, the headphone of the present invention is of a high industrial value.

What we claim is:

1. Headphone apparatus comprising:

a head band;

a pair of headphones, one of said headphones being attached to one end of said head band and the other attached to the opposite end of said head band, each of said headphones including a headphone case having a plurality of perforations provided through the rear surface thereof;

a baffle plate coupled to said headphone case;

a transducer unit attached to said baffle plate, said transducer unit comprising a vibrator element, a magnetic field producing element including a through hole extending through the center thereof and a first damper material provided between one end of said magnetic field producing element adjacent said through hole and said vibrator element;

a second damper material located within said headphone case; and a cover positioned in the front of said transducer unit, said cover having an air-permeable ear pad including a plurality of through holes therein, the acoustic resistances and inertances of said headphone being so established that the sound pressure versus frequency characteristics of said headphones are such that there are two peaks between 1.5 and 5 KHz and the level differences between the low level area and the peaks are limited within the range of 6 to 17 dB.

2. A headphone as defined in claim 1, wherein said head band is provided at both ends with recesses, each of said recesses being provided with an elongated base plate mounted across said recess, said elongated base plate including a longitudinal elongated slot formed therein, a supporting rod connected with the back surface of said housing of said headphone body, a slider having bosses and adapted to receive said supporting rod therethrough, said bosses being partly fitted into said elongated slot, and a leaf spring receiving therethrough said supporting rod projecting through said slot thereby fixing said supporting rod to said elongated base plate.

3. A headphone as defined in claim 1 wherein said transducer unit leads sound both to the front side and to the back side and is connected with said baffle plate, said baffle plate being provided with a plurality of sound radiating holes at the circumferential portion thereof, said air-permeable ear pad being disposed at a position corresponding to said sound radiating holes, whereby a listener can hear sound through said plurality of perforations and said plurality of sound radiating holes as well as direct sound from said transducer.

4. A headphone as defined in claim 1, wherein said transducer has a vibrating plate provided with a dome portion at the center, a cone portion around the dome portion and a corrugation portion around the cone portion thereby increasing the compliance and lowering the low frequency limit.

5. A headphone as defined in claim 1, wherein said baffle plate is provided, at the center, with a fixing opening for fixing the transducer unit and, in the peripheral portion of said fixing opening, a plurality of connecting holes each having a wide portion and a narrow portion formed adjoining each other, said transducer unit being provided with a grill at one side thereof, and at the peripheral portion of said grill, with connecting members corresponding in number to said connecting holes and each having a projection, said projection mating with the wide portion of said connecting hole, and said transducer unit being adapted to be connected with said baffle plate when said connecting members are inserted into the wide portions of said holes and said transducer unit is rotated in one direction to make said connecting members engage with the narrow portions of said holes.

* * * * *